United States Patent
Nagakura et al.

(10) Patent No.: US 8,992,811 B2
(45) Date of Patent: Mar. 31, 2015

(54) METHOD FOR MANUFACTURING SHAPED PRODUCT BY LOW-PRESSURE MOLDING

(71) Applicant: Teijin Limited, Osaka-shi, Osaka (JP)

(72) Inventors: Yasunori Nagakura, Matsuyama (JP); Motoomi Arakawa, Matsuyama (JP); Michiharu Taniguchi, Matsuyama (JP); Akihiko Obata, Matsuyama (JP)

(73) Assignee: Teijin Limited, Osaka-shi, Osaka (JP)

( * ) Notice: Subject to any disclaimer, the term of this patent is extended or adjusted under 35 U.S.C. 154(b) by 0 days.

(21) Appl. No.: 14/170,981

(22) Filed: Feb. 3, 2014

(65) Prior Publication Data

US 2014/0148072 A1    May 29, 2014

Related U.S. Application Data

(63) Continuation of application No. PCT/JP2012/070126, filed on Aug. 1, 2012.

(30) Foreign Application Priority Data

Aug. 3, 2011   (JP) ................. 2011-170209

(51) Int. Cl.
| | |
|---|---|
| *B29C 43/02* | (2006.01) |
| *D06M 15/705* | (2006.01) |
| *B29C 43/00* | (2006.01) |
| *B29C 70/46* | (2006.01) |
| *B29C 70/50* | (2006.01) |
| *B29C 70/12* | (2006.01) |
| *D04H 1/4242* | (2012.01) |
| *D04H 1/60* | (2006.01) |
| *D04H 1/732* | (2012.01) |
| *D06M 15/227* | (2006.01) |
| *D06M 15/507* | (2006.01) |
| *D06M 15/513* | (2006.01) |
| *D06M 15/59* | (2006.01) |
| *B29K 105/12* | (2006.01) |
| *B29K 101/12* | (2006.01) |
| *B29K 105/08* | (2006.01) |

(52) U.S. Cl.
CPC .......... *D06M 15/705* (2013.01); *B29C 43/003* (2013.01); *B29C 70/465* (2013.01); *B29C 70/506* (2013.01); *B29C 70/508* (2013.01); *B29C 70/12* (2013.01); *D04H 1/4242* (2013.01); *D04H 1/60* (2013.01); *D04H 1/732* (2013.01); *D06M 15/227* (2013.01); *D06M 15/507* (2013.01); *D06M 15/513* (2013.01); *D06M 15/59* (2013.01); *B29K 2105/128* (2013.01); *B29K 2101/12* (2013.01); *B29K 2105/0854* (2013.01)
USPC .......................... 264/115; 264/109; 264/257

(58) Field of Classification Search
None
See application file for complete search history.

(56) References Cited

U.S. PATENT DOCUMENTS

| | | | |
|---|---|---|---|
| 5,883,023 | A | 3/1999 | Martine et al. |
| 2009/0104418 | A1 | 4/2009 | Ohki et al. |
| 2013/0317161 | A1 | 11/2013 | Konagai et al. |
| 2014/0077412 | A1 | 3/2014 | Taniguchi et al. |

FOREIGN PATENT DOCUMENTS

| | | |
|---|---|---|
| EP | 2314642 A1 | 4/2011 |
| JP | H10-016103 A | 1/1998 |
| JP | H10-316771 A | 12/1998 |
| JP | 2008-254191 A | 10/2008 |
| JP | 2008-308543 A | 12/2008 |
| JP | 2009-113369 A | 5/2009 |
| JP | 2010-235779 A | 10/2010 |
| JP | 2010-253938 A | 11/2010 |
| JP | 2011-021303 A | 2/2011 |
| JP | 2011-178891 A | 9/2011 |
| JP | 5436700 B2 | 3/2014 |
| KR | 10-2008-0033315 | 4/2008 |
| WO | 2012-165418 A1 | 12/2012 |

OTHER PUBLICATIONS

Office Action issued May 26, 2014 in the corresponding European Application No. 12820043.3, five pages.
Office Action issued Jun. 23, 2014 in corresponding Korean patent application 10-2014-7002635.
International Search Report issued in corresponding International Application No. PCT/JP2012/070126 mailed Sep. 18, 2012.
Written Opinion issued in corresponding International Application No. PCT/JP2012/070126 mailed Sep. 18, 2012.
Office Action issued Mar. 18, 2014 in corresponding Japanese patent application JP 2013-526976.
Supplementary European Search Report issued on Apr. 24, 2014 in corresponding European patent application 12820043.3.
Jul. 21, 2014—(CA) Office Action—App 2,843,843.
Oct. 27, 2014—(KR) Office Action—App 10-2014-7002635.
Feb. 12, 2015—(EP) Third Party Observations—App 20120820043.
D.R. Mulligan et al., Composites Science and Technology 63 (2003) 715-725.
S.T. Jespersen et al., Polymer Composites 2010, pp. 653-665.

*Primary Examiner* — Mary F Theisen
(74) *Attorney, Agent, or Firm* — Banner & Witcoff, Ltd.

(57) ABSTRACT

This method for manufacturing a shaped product is characterized in preparing a specific random mat including a thermoplastic resin and carbon fiber bundles having an average fiber length of 5-100 mm, impregnating a thermoplastic resin into the random mat, pressing the random mat in a metal mold in a range of 0.1-20 MPa, and then taking out the random mat from the metal mold.

10 Claims, 5 Drawing Sheets

METHOD FOR MANUFACTURING SHAPED PRODUCT BY LOW-PRESSURE MOLDING

CROSS REFERENCE TO RELATED APPLICATION

This is a continuation of International Application No. PCT/JP2012/070126 filed on Aug. 1, 2012, and claims priority from Japanese Patent Application No. 2011-170209, filed on Aug. 3, 2011, the entire disclosures of which are incorporated herein by reference.

TECHNICAL FIELD

The present invention relates to a method of manufacturing a shaped product including a thermoplastic resin and carbon fibers. More specifically, the present invention relates to a method for manufacturing a shaped product including a thermoplastic resin and carbon fibers by a press molding method at a low pressure, and the shaped product obtained from the method.

BACKGROUND ART

A fiber-reinforced composite material, especially a composite material in which carbon fibers are used as reinforcing fibers, is expected to be applied to applications of a vehicle requiring to be light-weighted due to its high specific strength and specific rigidity. In particular, in a case where a matrix resin is thermoplastic, the material is promising from the standpoint of productivity and recyclability.

Patent Document 1 discloses a method including, impregnating carbon fibers having a specific fiber length with a resin, forming a preform in a sandwich structure by using a composite material precursor (prepreg) in which two single carbon fibers intersect within a specific range, and then press-molding the preform. Here, as a specific example, there is provided a sheet-making method which employs a wet method in order to intersect two single carbon fibers within a specific range. However, in many cases, such a method may require a drying process or the like, thereby complicating a manufacturing process. Further, it is difficult to form a prepreg with a relatively large thickness. Then, a large number of layered sheets are required at the time of molding, thereby complicating a molding process.

Patent Document 2 discloses a sheet material for a fiber-reinforced composite shaped product in which a plurality of reinforcing fiber bundles are randomly placed in a thermoplastic resin as a matrix. Here, in a state where the reinforcing fiber bundles are pulled and aligned at a predetermined ratio, the thermoplastic resin covers the periphery of the fiber bundles or impregnates into the fiber bundles, and then the fiber bundles are cut to be formed as chopped strands. Further, in Patent Document 2, the sheet material is inserted into a mold and molded by hot press. In this method, since the fiber bundles are cut after being covered with or impregnated with the thermoplastic resin, the cut chopped strands have a certain width and their fiber orientation tends to be close to one direction. Thus, there is a problem in that a high isotropy is hardly achieved even if the chopped strands are uniformly dispersed to obtain a shaped product sheet.

Patent Document 1: Japanese Patent Laid-Open Publication No. 2010-235779

Patent Document 2: Japanese Patent Laid-Open Publication H10-316771

SUMMARY OF INVENTION

A main object of the present invention is to provide a novel method of manufacturing a shaped product including a thermoplastic resin and carbon fibers.

Another object of the present invention is to provide a novel method of manufacturing the shaped product at a lower pressure by using a press molding method.

A further object of the present invention is to provide a method of easily manufacturing a large-sized shaped product by low-pressure molding.

A still further object of the present invention is to provide a shaped product which is good in mechanical isotropy, which may be manufactured by the above manufacturing methods.

Other objects and advantages of the present invention will be apparent from the following description.

The present inventors have investigated a method of manufacturing a shaped product (CFRTP) including carbon fibers and a thermoplastic resin by a low-pressure molding method excellent in productivity. In particular, they have focused on chopped strands with a specific length and a carbon fiber bundle thereof. As a result, they completed the present invention based on knowledge that it is very important to use a mat base material having the carbon fiber bundle satisfying a specific opening degree.

According to the present invention, objects and advantages of the present invention are achieved by:

[1] a method of manufacturing a shaped product including carbon fibers and a thermoplastic resin, the method including:

(1) a process of preparing a random mat which includes the carbon fibers including carbon fiber bundles with an average fiber length of 5 mm to 100 mm and the thermoplastic resin;

(2) a process of impregnating the thermoplastic resin into the carbon fiber bundles by heating and pressurizing the random mat up to a temperature of a melting point or more and less than a decomposition temperature in a case where the thermoplastic resin is crystalline, or up to a temperature of a glass transition temperature or more and less than a decomposition temperature in a case where the thermoplastic resin is amorphous before or after arranging the random mat within a mold;

(3) a process of pressurizing and molding the impregnated random mat within the mold at a pressure ranging from 0.1 MPa to 20 MPa; and (4) a process of taking out the obtained shaped product from the mold, in which, the processes (1) to (4) are performed in this order, in the random mat, the carbon fibers have a fiber areal weight ranging from 25 g/m$^2$ to 10,000 g/m$^2$, are substantially randomly oriented in-plane direction, and the carbon fiber bundles include carbon fiber bundles (A) having the carbon fibers of not less than a critical number of single fiber defined by following equation (1), and carbon fibers (B) having the carbon fibers of less than the critical number of single fiber, in which a ratio of the carbon fiber bundles (A) is 20 Vol % or more and less than 99 Vol % based on a total amount of the carbon fibers in the random mat.

$$\text{critical number of single fiber} = 600/D \quad (1)$$

(in which, D represents an average fiber diameter (μm) of single carbon fiber)

Also, the present invention includes the following invention.

[2] The method according to [1], wherein the process (1) includes a process (1-1) of cutting and then opening the carbon fibers.

[3] The method according to [1] or [2], wherein, in the process (3), the pressure ranges from 0.5 MPa to 10 MPa.

[4] The method according to [3], wherein the pressure ranges from 0.5 MPa to 5 MPa.

[5] The method according to any one of [1] to [4], wherein the process (2) includes a process (2-1) of impregnating the thermoplastic resin into the carbon fiber bundles by heating and pressurizing the random mat before arranging the random mat within the mold, and the process (3) includes a process (3-1) of arranging the impregnated random mat within the mold, and pressurizing and molding the random mat in the mold controlled to a temperature less than a crystallization temperature in a case where the thermoplastic resin is crystalline, or to a temperature less than a glass transition temperature in a case where the thermoplastic resin is amorphous.

[6] The method according to [5], wherein the process (3-1) includes a process (3-2) of clamping the mold at a slide lowering speed of 50 mm/sec to 10,000 mm/sec before pressurizing the random mat.

[7] The method according to any one of [1] to [4], wherein the process (2) includes a process (2-2) of impregnating the thermoplastic resin into the carbon fiber bundles by heating and pressurizing the random mat, due to heating the mold up to the temperature of a melting point or more and less than the decomposition temperature in a case where the thermoplastic resin is crystalline, or up to the temperature of a glass transition temperature or more and less than the decomposition temperature in a case where the thermoplastic resin is amorphous, after arranging the random mat within the mold, and the process (3) is performed after the process (2-2).

[8] The method according to any one of [1] to [7], wherein a content ratio of the thermoplastic resin to the carbon fibers in the random mat ranges from 50 parts to 1,000 parts by weight based on 100 parts by weight of the carbon fibers.

[9] The method according to any one of [1] to [8], wherein an average number of the fibers (N) in the carbon fiber bundles (A) in the random mat satisfies following equation (2).

$$0.7 \times 10^4/D^2 < N < 1 \times 10^5/D^2 \quad (2)$$

(in which, D represents an average fiber diameter (μm) of single carbon fiber)

[10] The method according to any one of [1] to [9], wherein a ratio of the carbon fiber bundles (A) is 30 Vol % or more and less than 90 Vol % based on a total amount of the fibers in the random mat.

[11] A shaped product obtained by the manufacturing method according to any one of [1] to [10], wherein a ratio (Eδ) obtained by dividing a larger value by a smaller value of tensile modului in an arbitrarily direction and a direction perpendicular to the arbitrarily direction ranges from 1.0 to 1.4.

[12] A shaped product obtained by the manufacturing method according to any one of [1] to [10], wherein when a test piece of the shaped product is cut out in an arbitrarily direction and a direction perpendicular to the arbitrarily direction, a ratio (Vfs) obtained by dividing a larger value by a smaller value of fiber volume fractions (Vf) ranges from 1.0 to 1.2.

REFERENCE SIGNS LIST 1. mold shape plan view, 2. B-B cross-sectional view, 3. A-A cross-sectional view, 4. shaped product plan view, 5. cut-out position of tensile test piece, 6. cut-out position of Vf measurement sample

DESCRIPTION OF EMBODIMENTS

Hereinafter, exemplary embodiments of the present invention will be described.

The present invention provides a method for manufacturing a shaped product including carbon fibers and a thermoplastic resin. In the method, the following processes (1) to (4) are sequentially performed:

(1) preparing a random mat including carbon fiber bundles with an average fiber length of 5 mm to 100 mm and a thermoplastic resin, (2) impregnating the thermoplastic resin into the carbon fiber bundles by heating and pressurizing the random mat up to a temperature of a melting point or more and less than a decomposition temperature in a case where the thermoplastic resin is crystalline, or up to a temperature of a glass transition temperature or more and less than a decomposition temperature in a case where the thermoplastic resin is amorphous, before or after arranging the random mat within a mold, (3) pressurizing and molding the impregnated random mat within the mold at a pressure ranging from 0.1 MPa to 20 MPa, and (4) taking out the obtained shaped product from the mold.

Hereinafter, the respective processes will be sequentially described.

[Process of Preparing Random Mat (1)]

Carbon fibers that constitute the random mat of the present invention are not continuous fibers, but discontinuous fibers including carbon fiber bundles with an average fiber length ranging from 5 mm to 100 mm.

The average fiber length of the carbon fiber bundles ranges from 5 mm to 100 mm. A shaped product made of a fiber-reinforced composite material including carbon fiber bundles having the specific average fiber length may be provided by obtaining a random mat satisfying a specific opening degree through a preferable manufacturing method of a random mat be described later. The shaped product develops a high physical property against an impact load or a long-term fatigue load as well as static strength or rigidity. According to the manufacturing method of the present invention, even if a shaped product having a complicated shape is molded, random orientation of carbon fibers is hardly disordered. Accordingly, in the most part of the shaped product, it is possible to maintain the carbon fibers in two-dimensional isotropy and random orientation in a plane direction. The average fiber length of the carbon fiber bundles preferably ranges from 10 mm to 100 mm, more preferably from 15 mm to 100 mm, and further more preferably 15 mm to 80 mm. The average fiber length of the carbon fiber bundles most preferably ranges from 20 mm to 60 mm. The average fiber length of carbon fibers (bundles) included in the random mat was obtained by measuring and recording the lengths of randomly extracted 100 carbon fibers up to a unit of 1 mm by using a loupe. From all of the measured lengths (Li) of the carbon fibers, the average fiber length may be obtained by the following equation.

For carbon fibers included in the shaped product, the lengths of randomly extracted 100 carbon fibers up to a unit of 1 mm were measured and recorded by using a loupe after a resin was removed within a furnace at 500° C. for about 1 hour. From all of the measured lengths (Li) of the carbon fibers, the average fiber length may be obtained by the following equation.

Average fiber length=$\Sigma Li/100$

The carbon fiber bundles in the present invention may include fibers with only one fiber length or a plurality of fiber lengths as long as the average fiber length is within the foregoing range. Of course, a distribution of fiber lengths may be present. The distribution may include two or more peaks.

In the carbon fibers constituting the random mat, besides the foregoing carbon fiber bundles, single fibers and/or carbon fiber bundles having the carbon fibers of less than the critical number of single fiber are present. These are referred to as carbon fibers (B), and carbon fiber bundles having the carbon fibers of not less than the critical number of single fiber are referred to as carbon fiber bundles (A).

Specifically, the carbon fiber bundles (A) having the carbon fibers of not less than a critical number of single fiber defined by following equation (1), and the carbon fibers (B), that is, at least one of carbon fiber bundles ($B_1$) having the carbon fibers less than the critical number of single fiber and single carbon fibers ($B_2$) are mixed.

Critical number of single fiber=$600/D$  (1)

The reinforcing fiber bundles (A) have a volume ratio of 20 Vol % or more and less than 99 Vol % based on the total amount of carbon fibers constituting the random mat (the total of carbon fiber bundles (A) and carbon fibers (B)). The carbon fibers (B), that is, a total of carbon fiber bundles ($B_1$) and single carbon fibers ($B_2$), have a volume ratio of greater than 1 Vol % and 80 Vol % or less based on the total amount of the carbon fibers constituting the random mat. In this manner, the present invention is characterized in that, carbon fiber bundles (A) having the carbon fibers of not less than a specific number of single carbon fibers and has a controlled opening degree, and other carbon fibers (B) at a ratio of greater than 1 Vol % and 80 Vol % or less are included. When the ratio of the carbon fiber bundles (A) is less than 20 Vol % based on the total amount of the carbon fibers, there is an advantage in that a shaped product with a high surface appearance may be obtained, but it is difficult to flow the carbon fibers within a mold at the time of molding the random mat. Thus, the carbon fibers may not be filled up to the mold cavity end, and thus it is difficult to obtain a shaped product according to a design dimension. When the ratio of the carbon fiber bundles (A) is 99 Vol % or more, an entangled portion of the carbon fibers becomes locally thick, and thus it is difficult to achieve isotropy. That is, when the carbon fibers (B) are included at a ratio of greater than 1 Vol % and 80 Vol % or less, an isotropic shaped product that is good in mechanical properties may be obtained. Also, a shaped product with a good moldability may be manufactured to cope with a thin-walled size.

The lower limit of the ratio of the carbon fiber bundles (A) is preferably 30 vol %, and more preferably 50 vol % based on the total amount of the carbon fibers constituting the random mat. The upper limit is preferably 90 vol %, and further more preferably 70 vol %. A preferably range of the carbon fiber bundles (A) is 30 Vol % or more and less than 90 Vol %.

The carbon fibers (B) contain ($B_2$) carbon fiber bundles of which at least a part is completely opened to be in the form of single fibers and ($B_1$) carbon fiber bundles which have a single fiber number less than the critical number of single fiber to be incompletely or partially opened. With respect to the ratio of the carbon fiber bundles ($B_1$) to the single carbon fibers ($B_2$), the ratio of the carbon fiber bundles ($B_1$) preferably ranges from 1% to 99%, and more preferably from 20% to 70%, based on the total volume of the carbon fiber bundles ($B_1$) and the single carbon fibers ($B_2$).

The ratio of the carbon fiber bundles (A) may be controlled by combining conditions of a widening process, a slit process, a cutting process, and an opening process, for example, in the manufacturing method as described below.

The average fiber diameter of the carbon fibers is not particularly limited, but preferably ranges from 3 μm to 12 μm, more preferably from 5 μm to 9 μm and further more preferably from 5 μm to 7 μm.

The critical number of single fiber of the carbon fiber bundles (A) ranges from 86 to 120 when the average fiber diameter of the carbon fibers ranges from 5 μm to 7 μm. When the critical number of single fiber is less than 86, the fiber bundles become close to single fibers, that is, ($B_1$) and ($B_2$) tend do be increased. In such a case, there is a possibility that entanglements among the carbon fibers within the random mat become strong, and the flowability is lowered at the time of molding a shaped product. When the critical number of single fiber is greater than 120, entanglements among the carbon fibers become weak. In such a case, the flowability in manufacturing is improved, but orientation of the carbon fibers may easily occur. Thus, the shaped product obtained therefrom may become anisotropic.

An average number of the fibers (N) in the carbon fiber bundles (A) preferably satisfies following equation (2)

$$0.7\times10^4/D^2 < N < 1\times10^5/D^2 \quad (2)$$

(in which, D represents an average fiber diameter (μm) of single carbon fiber)

When the average fiber diameter of carbon fibers is 5 μm, the average number of the fibers within fiber bundles ranges from 280 to 4000. In particular, in order to easily maintain the appearance or isotropy, the average number preferably ranges from 600 to 1600. When the average fiber diameter of carbon fibers is 7 μm, the average number of fibers within fiber bundles ranges from 142 to 2040. In particular, in order to easily maintain the appearance or isotropy, the average number preferably ranges from 300 to 800.

In the equation (2), when the average number of the fibers (N) within the carbon fiber bundles (A) is $0.7\times10^4/D^2$ or less, it is difficult to obtain a shaped product with a high fiber volume fraction (Vf), as a whole. When the average number of the fibers (N) within the carbon fiber bundles (A) is $1\times10^5/D^2$ or more, a thick portion locally occurs within a shaped product, which is liable to case voids. The average number of the fibers (N) within the carbon fiber bundles (A) more preferably satisfies following equation (2-1).

$$0.7\times10^4/D^2 < N < 6\times10^4/D^2 \quad (2-1)$$

In a case where carbon fibers that are only separated are simply used in order to obtain a thin-walled shaped product of 1 mm or less in thickness, a good physical property may not be obtained due to high unevenness in fiber areal weight. Further, when all fibers are opened, thinner one may be easily obtained, but a shaped product with a high fiber volume fraction may not be obtained due to an increase of entanglement in fibers. When both carbon fiber bundles (A) having the carbon fibers of not less than the critical number of single fiber defined by equation (1), and single carbon fibers ($B_2$) and/or carbon fibers ($B_1$) having the carbon fibers of less than the critical number of single fiber are present in the random mat, it is possible to obtain a shaped product that is thin-walled and has a high development rate of physical properties.

The thickness of the random mat is not particularly limited as long as the thickness is 0.5 mm or more. In order to exhibit the effect of the present invention, that is, in order to obtain a thin-walled shaped product made from the random mat, the thickness preferably ranges from 1 mm to 100 mm, and more preferably from 2 mm to 50 mm. A plurality of sheets of the random mat may be layered to be used in the following process.

In the random mat used in the present invention, the fiber areal weight of carbon fibers ranges from 25 g/m$^2$ to 10,000 g/m$^2$. When the fiber areal weight is less than 25 g/m$^2$, distribution of the carbon fibers within the random mat may easily become uneven, and a sufficient reinforcing effect may not be developed. When the fiber areal weight is greater than 10,000 g/m$^2$, it is difficult to impregnate the fibers with a thermoplastic resin at the time of manufacturing the prepreg due to excessively many carbon fibers, and thus voids which are defects within the shaped product tend to easily occur. Further, as compared to the thermoplastic resin, the carbon fibers have a large specific gravity, and thus the shaped product becomes heavy. The fiber areal weight preferably ranges from 25 g/m$^2$ to 6000 g/m$^2$, and more preferably from 25 g/m$^2$ to 3000 g/m$^2$.

In the random mat in the present invention, carbon fibers are not aligned in a specific direction, but substantially disorderly and randomly oriented in a plane direction. That is, the carbon fibers are arranged in scattering directions in the plane direction. The isotropy of the shaped product finally obtained by molding the random mat is two-dimensionally maintained.

The random mat may include, besides the above described carbon fibers, inorganic fibers such as glass fibers, stainless steel fibers, alumina fibers, and mineral fibers, and organic fibers such as polyetheretherketone fibers, polyphenylene sulfide fibers, polyether sulfone fibers, aramid fibers, polybenzooxazole fibers, polyarylate fibers, polyketone fibers, polyester fibers, polyamide fibers, and polyvinyl alcohol fibers within a range that does not impair the object of the present invention (for example, within a range of 30% or less based on the total amount of carbon fibers).

The random mat in the present invention includes, besides the foregoing carbon fiber bundles, a thermoplastic resin. Examples of the type of the thermoplastic resin may include polyolefin such as a polyethylene resin, or a polypropylene resin, polyamide such as a polyamide 6 resin, a polyamide 11 resin, a polyamide 12 resin, a polyamide 46 resin, a polyamide 66 resin, or a polyamide 610 resin, aromatic polyester such as a polycarbonate resin, a polyethylene terephthalate resin, a polyethylene naphthalate resin, a polybutylene terephthalate resin, or a polyarylate resin, aliphatic polyester such as a polylactic resin, a vinyl chloride resin, a vinylidene chloride resin, a polyvinyl acetate resin, a polyvinyl alcohol resin, a polystyrene resin, an acrylonitrile-styrene resin (AS resin), an acrylonitrile-butadiene-styrene resin (ABS resin), an acrylic resin, a methacrylate resin, a polyacetal resin, a polyphenylenether resin, a polyphenylene sulfide resin, a polysulfone resin, and a polyethersulfone resin, a polyether ether ketone resin. Two or more kinds of these resins may be used in combination.

Among them, polyolefin, polyamide, and aromatic polyester are preferable because they are good in the balance in performance such as moldability, productivity, and mechanical strength.

The content ratio of the thermoplastic resin in the random mat ranges preferably from 50 parts to 1,000 parts by weight, more preferably from 50 parts to 500 parts by weight based on 100 parts by weight of the total of carbon fiber bundles (A) and carbon fibers (B). More preferably, the ratio of the thermoplastic resin ranges from 60 parts to 300 parts by weight based on 100 parts by weight of the total. When the ratio of the thermoplastic resin is less than 50 parts by weight based on 100 parts by weight, voids may easily occur within the obtained shaped product, thereby lowering strength or rigidity. When the ratio of the thermoplastic resin is greater than 1,000 parts by weight, it is difficult to develop a reinforcing effect due to containing of carbon fibers.

The fiber volume fraction (Vf) ranges preferably from 5% to 80%, and more preferably from 20% to 60% based on the volume of the shaped product (all carbon fibers+thermoplastic resin) in the random mat and the shaped product obtained by the present invention. When the fiber volume fraction of carbon fibers is lower than 5%, a reinforcing effect due to containing the carbon fibers may not be sufficiently developed. When the fiber volume fraction is greater than 80%, voids may easily occur within a shaped product, and thus the physical property of the shaped product may be reduced.

The random mat may contain functional fillers or additives within a range that does not impair the object of the present invention. Examples thereof may include organic/inorganic fillers, a flame retardant, an anti-UV agent, a pigment, a releasing agent, a softening agent, a plasticizer and a surfactant, but the present invention is not limited thereto. Especially, since electronic/electrical equipment applications or automotive applications may require high flame retardancy, the thermoplastic resin preferably contains a flame retardant. Examples of the flame retardant may include those conventionally known. Specifically, the examples may include a phosphorous-based flame retardant, a nitrogen-based flame retardant, a silicone compound, an organic alkali metal salt, an organic alkali earth metal salt, or a brominated flame retardant. These flame retardants may be used alone or in combination thereof. The content of the flame retardant ranges preferably from 1 part to 40 parts by weight, and more preferably from 1 part to 20 parts by weight based on 100 parts by weight of the resin in consideration of balance of a physical property, a moldability, and a flame retardancy.

The random mat used in the present invention may have various thicknesses, and may be used as a prepreg to finally suitably obtain a thin-walled shaped product with a thickness ranging from about 0.2 mm to 1 mm. That is, by forming a random mat according to the thickness of a required shaped product, it is possible to obtain a thin-walled shaped product, especially skin for a sandwich material or the like.

The ratio of the carbon fibers to the thermoplastic resin within the random mat may be determined according to amounts of respective components charged in the forming of the random mat. However, in order to more exactly evaluate the ratio of the fibers to the resin, the ratio may be confirmed by the following method. For example, in a method of using a difference in solubility of components, a specimen of 1 cm$^2$ to 10 cm$^2$ is weighed. A chemical liquid for dissolving or decomposing either the fibers or the resin is used to extract a dissolved component. Then, the residue is washed, dried and weighed. Volume fractions of the fibers and the resin are calculated from weights of the residue and the dissolved component, and specific gravities of the fibers and the resin.

For example, when polypropylene is used as the resin, the polypropylene may be solely dissolved using heated toluene or xylene. When the resin is polyamide, the polyamide may be decomposed using heated formic acid. When the resin is polycarbonate, the polycarbonate may be dissolved using heated chlorinated hydrocarbon. Also, their weights and volume fractions may be calculated by burning off the resin. In this case, a weight of a sufficiently dried specimen is weighed, and then is treated using an electric furnace or the like at 500° C. to 700° C. for 5 to 60 minutes so as to burn the resin component. The fibers remaining after the combustion are left cool in a dry atmosphere, and weighed so as to calculate weights of the respective components.

In the present invention, the manufacturing method of the random mat is not particularly limited. For example, in the manufacturing, a thermoplastic resin in a fibrous form and/or a particulate form may be present to be mixed with the carbon fibers, or a random mat that does not include a matrix resin component may be supplied with a molten thermoplastic resin.

Hereinafter, a preferred manufacturing method of a random mat will be described. The manufacturing method of the random mat may be preferably a method for carrying out the following respective processes (I), (III), (IV), (V) or (V'), or more preferably a method for carrying out a process (II) between processes (I) and (III). By sequentially performing these processes, it is possible to manufacture a random mat having a particularly good isotropy, and further a shaped product from the random mat.

(I) Carbon Fiber Strand Supply Process

In a carbon fiber strand supply process, respective yarns of carbon fibers are drawn from a plurality of carbon fiber-wound yarn bodies arranged on a creel section, and are supplied as carbon fiber strands that are formed by yarns alone or a plurality of single fibers which are pulled and aligned. Here, the strand width preferably ranges from 10 mm to 50 mm (especially, from 20 mm to 30 mm) When the width of the strand of the carbon fibers to be supplied is small, the width may be widened up to a predetermined width in the strand supply process if necessary such that the strand may be supplied as a thin broad strand. The operation of widening the width may be performed by bringing the strand in contact with, for example, a roller or a bar for widening.

(II) Strand Slit Process

In the strand slit process, the supplied carbon fiber strand is continuously slit preferably in parallel to a strand length direction (that is, along the fiber axis direction) to obtain a plurality of narrow width strands with a strand width ranging from 0.05 mm to 5 mm, preferably from 0.1 mm to 1.0 mm. Specifically, the broad strand continuously transferred from the previous process may be continuously cut in a vertical direction by using a vertical slitter with a blade parallel to the fiber axis direction, or split into a plurality of strands according to one or a plurality of split guides provided in a traveling pathway of the broad strand. In this process, a guide or bar for widening may be provided on the line such that the carbon fibers may be widened while being slit.

(III) Carbon Fiber Cutting Process

Then, in the carbon fiber cutting process, strands that are not slit or narrow width carbon fiber strands which are slit as described above are cut to an average fiber length of 5 mm to 100 mm. A device used for cutting the carbon fibers to an average fiber length of 5 mm to 100 mm is preferably a rotary cutter. Especially, a rotary cutter provided with a spiral knife having a specific angle is preferred. A knife angle for continuously cutting the carbon fibers may be geometrically calculated in consideration of the width of the carbon fibers to be used or the average fiber length of the cut fibers, and the relationship thereof preferably satisfies the condition that the average fiber length of carbon fibers (pitch of blades)=carbon fiber strand width×tan(90−θ) (in which, θ represents an angle of the arrangement direction of a knife with respect to the circumferential direction).

For example, when a cutter that has a knife intersecting the fiber axis direction, and a knife parallel to the fiber axis direction is used, a fiber bundle may be slit in a vertical direction while being cut into a specific fiber length. When such a cutter is used, the strand slit process (II) and the carbon fiber cutting process (III) may be performed at once.

(IV) Carbon Fiber Opening Process

In the carbon fiber opening process, the strand pieces are opened to be split into fiber bundles with a required size (the number of bundled filaments). For example, an opening method using a gas or an opening method through slit may be used.

Specifically, in the opening method using the gas, the strand pieces are introduced into the pathway, and the gas such as air is blown to the strand pieces passing through the pathway such that the strand pieces are separated into a required bundle size and dispersed in the gas. The degree of opening may be appropriately controlled by, for example, pressure of the blown gas. In the opening method through slit, the strand width may be adjusted by the same operation as described in the foregoing strand slit process (II) to appropriately control the degree of opening.

In the carbon fiber opening process, not all fibers constituting the strand pieces are opened to be separated from each other and completely separated up to the form of single fibers. Some fibers are opened until they become in the form of single fibers or in the form near the form of single fibers, but most of the fibers are required to be adjusted such that they become fiber bundles in which a predetermined number or more of single fibers are bundled. That is, the degree of opening is required to satisfy the ratio of carbon fiber bundles (A) having a single fiber number not less than the critical number of single fiber defined by equation (1) to the carbon fibers (B) having a single fiber number less than the critical number of single fiber, more preferably it is required to satisfy the average number of the fibers (N) in the carbon fiber bundles (A).

(V) Random Mat Forming Process

In the random mat forming process, the cut and opened carbon fibers are spread in the air and at the same time, the thermoplastic resin in the form of powder or short fibers (hereinafter, they are generically referred to as "thermoplastic resin particles or the like") is supplied such that the carbon fibers together with the thermoplastic resin particles or the like are sprayed on a breathable support provided below an opening device. Thus, the carbon fibers and the thermoplastic resin particles or the like are mixed on the support and deposited/fixed to a predetermined thickness so as to form a random mat.

In the random mat forming process, the thermoplastic resin particles or the like are preferably supplied in a separate pathway from the carbon fibers opened by air, and they are sprayed at once toward the breathable support. They are deposited on the breathable support in a mat shape in a state where both are substantially uniformly mixed with each other, and fixed to keep the state. In that event, when the breathable support is constituted by a conveyor formed of a net and deposition is made on the conveyer while continuously moving the conveyer in one direction, a random mat may be continuously formed. Further, uniform deposition may be achieved when the support is moved back and forth, left and right.

In the random mat forming process, the carbon fibers and the thermoplastic resin particles or the like are preferably sprayed to be randomly oriented in a plane direction. In order to apply the opened carbon fibers to be two-dimensionally oriented, a tapered tube of, for example, conical shape that is expanded to the downstream side is preferably used. Within the tapered tube, because the gas blown to the carbon fibers is diffused and thus, the flow rate within the tube is decreased, a rotational force is imparted to the carbon fibers. By using the Venturi effect, the opened carbon fibers may be uniformly and spotlessly sprayed together with the thermoplastic resin particles or the like. Further, for the fixing process to be described below, it is desirable that the opened carbon fibers are sprayed on a movable breathable support (e.g., a net conveyor) having a suction mechanism at the lower side thereof and deposited in a random mat shape.

The random mat forming process includes a process of fixing the carbon fibers and the thermoplastic resin. The fixing process is a process of fixing the deposited carbon fibers and thermoplastic resin particles or the like. For example, a method of fixing the carbon fibers by suctioning air from the bottom side of the breathable support may be used. The thermoplastic resin that is sprayed together with the carbon fibers may be fixed by air suction when the thermoplastic resin is in the fibrous form, or may be fixed along with the carbon fibers even when the thermoplastic resin is in the particulate form.

By the suctioning from the bottom side of the deposition surface in this manner, a two-dimensionally randomly oriented mat may be obtained. In the random mat obtained in this manner, the thermoplastic resin particles or the like uniformly exist at or in the vicinity of gaps of the carbon fibers that constitute the random mat. Thus, in the heating, impregnating, and pressurizing processes (process (2)) to be described below, the moving distance of the resin is short, and the impregnation of the resin is enabled within a relatively short time.

Meanwhile, when the thermoplastic resin particles or the like partly pass through the support not to be deposited due to a large mesh opening of the sheet or the net constituting the breathable support, for example, a non-woven fabric may be set on the surface of the support, and the carbon fibers and the thermoplastic resin particles or the like may be sprayed to be fixed on the non-woven fabric.

After cutting the carbon fiber strands into a predetermined length, the strand pieces and the carbon fibers in the form of single fibers separated at the time of cutting may be supplied to a transport pathway for suction-conveyance. At the same time or successively, air may be sprayed to the carbon fibers from an air spray nozzle provided in the middle or front end of the transport pathway such that the cut strand pieces may be separated and opened into carbon fiber bundles with a required size (thickness). At the same time, the carbon fibers together with the thermoplastic resin particles or the like may be sprayed to the surface of a breathable support (hereinafter, may be referred to as "fixing net") that moves continuously or intermittently in a predetermined direction, and deposited and fixed to form a random mat.

As described above, since the carbon fibers and the thermoplastic resin in powder and/or fibrous form are present in a spotlessly mixed state in the random mat, it is not necessary to largely flow the fibers and the resin within a mold. Thus, there is an advantage in that impregnation of the thermoplastic resin may be easily performed. As a result, in the obtained shaped product, the isotropy of the carbon fibers within the random mat may be maintained.

(V') Random Mat Forming Process (Second Example)

In another random mat forming process, first, a random mat that includes carbon fibers is obtained in the same manner as in the random mat forming process (V) except that a matrix resin is not included. Subsequently, a method of supplying a molten thermoplastic resin to the foregoing random mat to obtain a random mat that includes the carbon fibers and the thermoplastic resin may be used. In such a method, for example, opened carbon fiber strands obtained from the carbon fiber opening process (IV) may be deposited in the mat shape, and at the same time, the thermoplastic resin in a molten state is ejected as a film-shaped melt from a die provided above. Then, the thermoplastic resin may be supplied to the deposited mat such that the almost entire surface of the mat is impregnated with the thermoplastic resin.

In this method, a preferred method of depositing the carbon fiber strands in the mat shape is the same as that described in (V) above. The supply amount of the thermoplastic resin is also the same as that in (V) above, but the amount of the molten thermoplastic resin that is extruded from the die, specifically, the thickness or extrusion rate of a film in a case of supply in a film-shape from the die may be appropriately adjusted.

As described above, the carbon fibers included in the random mat used in the present invention are cut and formed in a mat shape, and are subjected to an impregnating process using the thermoplastic resin.

[Process of Impregnating Thermoplastic Resin into Carbon Fiber Bundles (2)]

After the process (1), a process (2) of impregnating the thermoplastic resin into the carbon fiber bundles (hereinafter, may be referred to as an impregnating process (2)) is performed.

Here, the impregnating process (2) includes two methods. That is, the process includes (2-1) a method (cold press method) of supplying and impregnating the thermoplastic resin into the random mat and then putting them in the mold, and (2-2) a method (hot press method) of putting the random mat in the mold, and then supplying and impregnating the thermoplastic resin in the mold.

First, the Process (2-1) Will be Described.

In the cold press process, first, the random mat and the thermoplastic resin are heated to sufficiently impregnate the thermoplastic resin into the random mat. The temperature at the time of heating is a melting point or more and less than a decomposition temperature in a case where the thermoplastic resin is crystalline, or a glass transition temperature or more and less than a decomposition temperature in a case where the thermoplastic resin is amorphous. The heated thermoplastic resin is pressurized, if necessary, to penetrate into the random mat and to be impregnated into the carbon fiber bundles. Due to one of characteristics of the present invention, that is, the carbon fiber bundles have a specific length and the carbon fiber bundles (A) are present in a specific amount, the thermoplastic resin is sufficiently spread in the thickness direction of the carbon fiber bundles. The pressure at the time of pressurizing may range from 0.1 MPa to 5.0 MPa.

In this manner, the thermoplastic resin is impregnated into the random mat to obtain a prepreg. The obtained prepreg is maintained or re-heated (i) at a temperature of a melting point or more and less than a thermal decomposition temperature in a case where the thermoplastic resin is crystalline, or (ii) at a temperature of a glass transition temperature or more and less than a thermal decomposition temperature in a case where the thermoplastic resin is amorphous. Then, the prepreg is arranged within a mold for performing the following process (3). The temperature of the prepreg may be measured by a measuring instrument provided outside a heating furnace after a K-type thermocouple is attached on a prepreg surface.

The form of the carbon fibers in the prepreg is kept in a state within the random mat. That is, the carbon fibers within the prepreg are maintained at the same fiber length, isotropy, and opening degree as those in the random mat, and thus may be the same as those described in the random mat.

Then, the process (2-2) will be described.

In the hot press process, first, the random mat is put into a mold. Then, the mold is heated up to a temperature of a melting point or more and less than a decomposition temperature in a case where the thermoplastic resin is crystalline, or up to a temperature of a glass transition temperature or more and less than a decomposition temperature in a case where the thermoplastic resin is amorphous, so as to heat both the thermoplastic resin and the random mat. The heated thermoplastic resin is preferably pressurized to penetrate into the random mat and to be impregnated into the carbon fiber bundles. Due to one of characteristics of the present invention, that is, the carbon fiber bundles have a specific length and the carbon fiber bundles (A) are present in a specific amount, the thermoplastic resin is sufficiently spread in the thickness direction of the carbon fiber bundles. The pressure at the time of pressurizing may range from 0.1 MPa to 5.0 MPa. Here, the pressure is maintained at a pressure lower than the pressure used in the following process (3) (0.1 MPa to 20 MPa), preferably for 0.5 min to 20 min to impregnate the thermoplastic resin into the carbon fiber bundles. The random mat is heated up to a temperature of a melting point or more of the thermoplastic resin and less than a thermal decomposition temperature in a case where the thermoplastic resin is crystalline, or up to a temperature of a glass transition temperature or more of the thermoplastic resin and less than a thermal decomposition temperature in a case where the thermoplastic resin is amorphous. A time for shift to the following process (3) may be appropriately selected according to the performance of a molding machine, but preferably ranges from 1 sec to 100 sec in order to reduce a molding time.

[Process of Pressurizing and Molding (3)]

The prepreg obtained from the cold press process (2-1) is arranged within the mold to be used for press molding at a specific temperature and a specific pressure in the process (3). The mold temperature at the time of press molding may be less than a melting point (preferably, a crystallization temperature or less) in a case where the thermoplastic resin is crystalline, and less than a glass transition temperature in a case where the thermoplastic resin is amorphous. Due to such adjustment for heating at a relatively low temperature, a time of press molding and a time of taking out the shaped product are shortened, and productivity is good. The temperature of the mold is preferably adjusted to a temperature of a melting point-10° C. or less (preferably crystallization temperature −10° C. or less) in a case where the thermoplastic resin is crystalline, or up to a temperature of a glass transition temperature-10° C. or less in a case where the thermoplastic resin is amorphous.

In this process, in order to perform mold clamping, a slide lowering speed at the time of pressing preferably ranges from 50 mm/sec to 10,000 mm/sec, and more preferably from 100 mm/sec to 1,000 mm/sec. The heated prepreg is solidified when its temperature is lowered. Thus, it is preferable that the mold clamping speed is high. However, when the speed is too high, a problem may be caused in durability or safety of the mold. When the prepreg is pressurized up to a target pressure, a time required for reaching the target pressure preferably ranges from 0.01 sec to 10 sec.

The target pressure ranges from 0.1 MPa to 20 MPa, preferably from 0.5 MPa to 10 MPa, and more preferably from 0.5 MPa to 5 MPa. It is preferable that the upper limit of the pressure is low, and the pressure less than 3 MPa is ideal. When the target pressure is less than 0.1 MPa, sufficient flowing may not be performed, and thus the shape of a shaped product may not be obtained. When the target pressure is greater than 20 MPa, the capacity of a molding machine or utility equipment is increased in a case where a large shaped product is molded. In the present invention, since the specific carbon fiber bundles (A) and the specific carbon fibers (B) as described above are included, a sufficient flowability is achieved at the time of pressing in a state where orientation of the fibers is maintained, that is, isotropy is maintained. Thus, a complicated shaped or large-sized shaped product may be manufactured.

The thickness of the prepreg within the mold may be appropriately selected according to the thickness of the shape of the required shaped product. However, as described below, when the charge rate of the prepreg in the mold is 50% or more and 80% or less, it is preferable that the thickness of the prepreg or the total thickness of layered prepregs is 1.0 mm or more in order to properly perform the flowing.

In the process (3) after the hot press process (2-2), the random mat that has been impregnated within the mold by being pressurized in a range from preferably 0.1 MPa to 5.0 MPa as described above, is press-molded at a pressure ranging from 0.1 MPa to 20 MPa. Here, the mold temperature may be the same as the mold temperature in the foregoing process (2-2), or may be raised up to 1° C. or more and less than a thermal decomposition temperature. The press may be either one-stage pressurization or multi-stage pressurization. In the multi-stage pressurization, at latter stages, warming or cooling may be performed, or warming and cooling may be alternately performed.

When the prepreg in the process (3) or the random mat in the process (2) is arranged within the mold, the charge rate represented by following equation (3) preferably ranges from 50% to 100%.

$$\text{charge rate (\%)} = 100 \times \text{base material area (mm}^2\text{)/mold cavity projection area (mm}^2\text{)} \quad (3)$$

(in which, the base material area represents a projection area in a draft direction of all arranged prepregs, and the mold cavity projection area represents a projection area in a draft direction)

For example, one or 2 to 10 overlapping prepregs may be arranged in a mold cavity. In a case where they overlap each other, the prepregs may partially or fully overlap each other according to a shaped product to be obtained. It is preferable that a part or all surfaces of ends of the prepregs are not in contact with edges of the mold cavity. Also, in a case where they overlap each other, all prepregs do not have to have the same shape, but are required to partially or fully overlap each other.

[Process of Taking Out Shaped Product from Mold (4)]

In the process (4), the mold temperature is adjusted to be less than a melting point (preferably, less than a crystallization temperature) in a case where the thermoplastic resin is crystalline, and to be less than a glass transition temperature in a case where the thermoplastic resin is amorphous so as to complete the molding. Specifically, after the mold is cooled through heat exchange with the mold up to a temperature less than a crystallization temperature in a case where the thermoplastic resin is crystalline or a temperature less than a glass transition temperature in a case where the thermoplastic resin is amorphous, the shaped product is taken out by opening the mold. The temperature of the mold is preferably not less than a melting point (preferably crystallization temperature)−200° C. and not greater than a melting point (preferably crystallization temperature)−10° C. in a case where the thermoplastic resin is crystalline, or preferably not less than a glass transition temperature−200° C. and not greater than a glass transition temperature−10° C. in a case where the thermoplastic resin is amorphous.

Specifically, the mold temperature preferably ranges from 40° C. to 180° C., and more preferably from 60° C. to 160° C. When the mold temperature is lower than 40° C., the temperature within the mold may be rapidly cooled, and thus a required shaped product may not be obtained. When the mold temperature is greater than 180° C., the temperature of the shaped product to be released may be too high, and thus warpage or deformation may occur after the release. There is no specific limitation in the cooling method of the mold. The mold may be appropriately cooled by, for example, a method of flowing a cooling medium in a temperature control circuit within the mold.

As compared to a case of performing a cold press process, a case of performing a hot press process may require a longer time for a cooling process, but the time may be appropriately controlled by a cooling condition or the like. The cooling time preferably ranges from 0.1 min to 10 min from the standpoint of reducing a molding time.

[Shaped Product Obtained in the Present Invention]

The shaped product in the present invention, as described above, may be obtained by molding the fiber-reiforced composite material made of the foregoing random mat. In the composite material, it is preferable that the thermoplastic resin is sufficiently impregnated into the carbon fiber bundles and between single carbon fibers, and the impregnation degree is 90% or more. The impregnation degree of the thermoplastic resin into the carbon fibers is more preferably 95% or more. When the impregnation degree is low, the physical properties of the shaped product may not reach a required level. Also, in the shaped product made of the fiber-reiforced composite material, the fiber length of the carbon fibers and the ratio of the carbon fiber bundles to the single carbon fibers are maintained at the same level as those in the random mat. Further, the shaped product is substantially maintained at the same isotropy, and opening degree as those in the random mat, and thus may be the same as those described in the random mat.

In respective portions having different thicknesses of the shaped product of the present invention, fiber volume fractions (Vf) may be almost the same, or the content of the carbon fibers may be inclined, and they may be appropriately selected according to the application of the required shaped product. In the respective portions having different thicknesses, in order to achieve a predetermined fiber reinforcing effect, it is preferable that all portions have substantially the same Vf. "Respective portions have substantially the same Vf" specifically represents that when a test piece is cut out from any point, the ratio obtained by dividing a larger value by a smaller value ranges from 1.0 to 1.2.

The shaped product in the present invention is substantial isotropic. The term "substantial isotropic" represents that when a tensile test is performed based on an arbitrarily direction of a shaped product, and a perpendicular direction to the arbitrarily direction, and tensile modulus are measured, the ratio (Eδ) obtained by dividing a larger value by a smaller value of the measured tensile modulus values is not greater than 1.4. The ratio is preferably 1.3 or less.

Therefore, according to the present invention, it will be easily understood that the following shaped product is included. That is, the shaped product includes carbon fibers with an average fiber length of 5 mm to 100 mm and a thermoplastic resin, in which the carbon fibers have a fiber areal weight ranging from 25 g/m² to 10,000 g/m², are substantially randomly oriented in-plane direction, and include carbon fiber bundles (A) having the carbon fibers of not less than the critical number of single fiber defined by following equation (1), and carbon fibers (B) having the carbon fiber of less than the critical number of single fiber, in which the ratio of the carbon fiber bundles (A) is 20 Vol % or more and less than 99 Vol % based on the total amount of the fibers in the random mat, the content ratio of the thermoplastic resin to the carbon fibers ranges from 50 parts to 1,000 parts by weight based on 100 parts by weight of the carbon fibers, the ratio (Eδ) obtained by dividing a larger value by a smaller value of tensile modului in an arbitrarily direction and a direction perpendicular to the arbitrarily direction is 1.0 or more and not greater than 1.4, when a test piece of the shaped product is cut out in an arbitrarily direction and a direction perpendicular to the arbitrarily direction, the ratio (Vfs) obtained by dividing a larger value by a smaller value of the fiber volume fractions (Vf) ranges from 1.0 to 1.2.

$$\text{critical number of single fiber} = 600/D \qquad (1)$$

(in which, D represents an average fiber diameter (μm) of single carbon fiber)

EXAMPLE

Hereinafter, examples will be described, but the present invention is not limited thereto.

1. Carbon Fibers

In the present examples, the following two kinds of carbon fibers were used.

(1) TENAX STS40-24KS: manufactured by TOHO TENAX Co., Ltd. (fiber diameter 7 μm, fiber width 10 mm)

(2) TENAX IMS60-12K: manufactured by TOHO TENAX Co., Ltd. (fiber diameter 5 μm, fiber width 6 mm)

2. Matrix Resin (1) Polycarbonate resin (Panlite L-1225L: polycarbonate manufactured by Teijin Chemicals Ltd., glass transition temperature 145° C. to 150° C., thermal decomposition temperature 350° C.)

(2) PA66 fiber (T5 nylon (tex 1,400 dtex): polyamide 66 fiber manufactured by Asahi Kasei Fibers Corporation, melting point 260° C., thermal decomposition temperature about 310° C.)

(3) Polybutylene terephthalate (PBT) resin (Duranex 500FP: manufactured by Polyplastics Co., Ltd., melting point 220° C., decomposition temperature about 330° C.)

(4) PA6 resin (A1030: manufactured by Unitika Ltd., melting point 220° C., decomposition temperature 300° C.)

(5) Polypropylene (PP) resin (Prime Polypro J108M: polypropylene manufactured by Prime Polymer Co., Ltd., melting point 170° C., thermal decomposition temperature about 280° C.)

Figure 3:
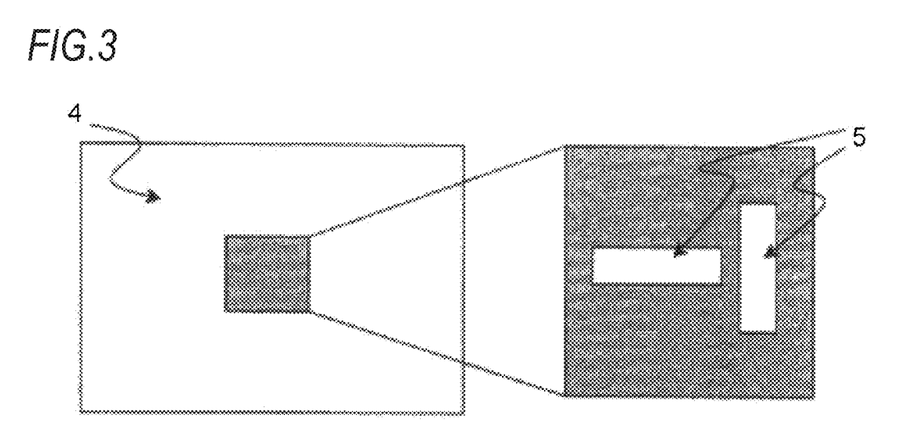
FIG. 3 is a schematic view illustrating cut-out positions of tensile test pieces of shaped products obtained from Examples 1 to 5, Comparative Example 1 and Reference Example 1.

3. Calculation of a ratio (Eδ) obtained by dividing a larger value by a smaller value of tensile modului At a position illustrated in FIG. 3, a sample was cut out in an arbitrarily direction of the obtained shaped product, and a perpendicular direction to the arbitrarily direction. A universal tester manufactured by Instron Corporation was used to perform a tensile test in accordance with JIS K-7164, and based on the result, the ratio was calculated.

4. Calculation of a ratio (Vfs) obtained by dividing a larger value by a smaller value of fiber volume fractions (Vf)

Figure 4:
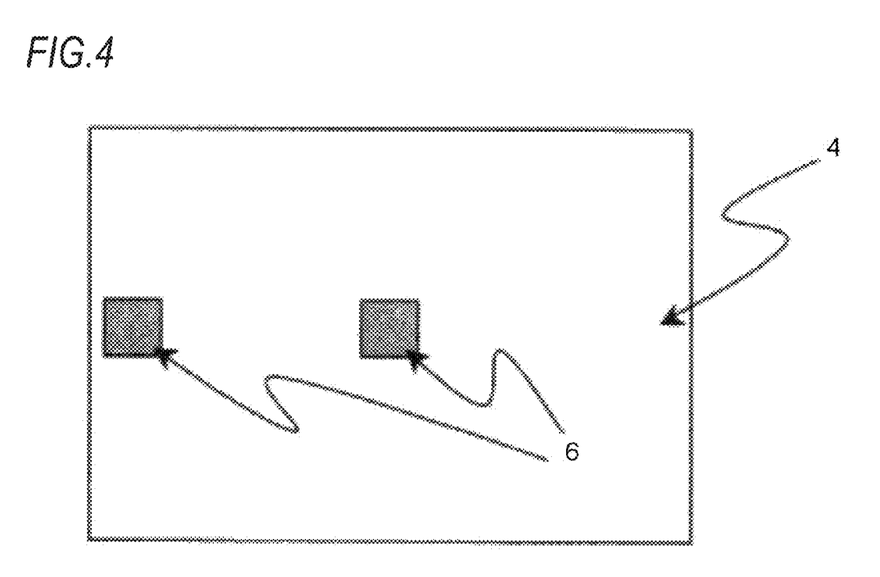
FIG. 4 is a schematic view illustrating Vf measurement positions of shaped products obtained from Examples 1 to 5, Comparative Example 1 and Reference Example 1.
Figure 5:
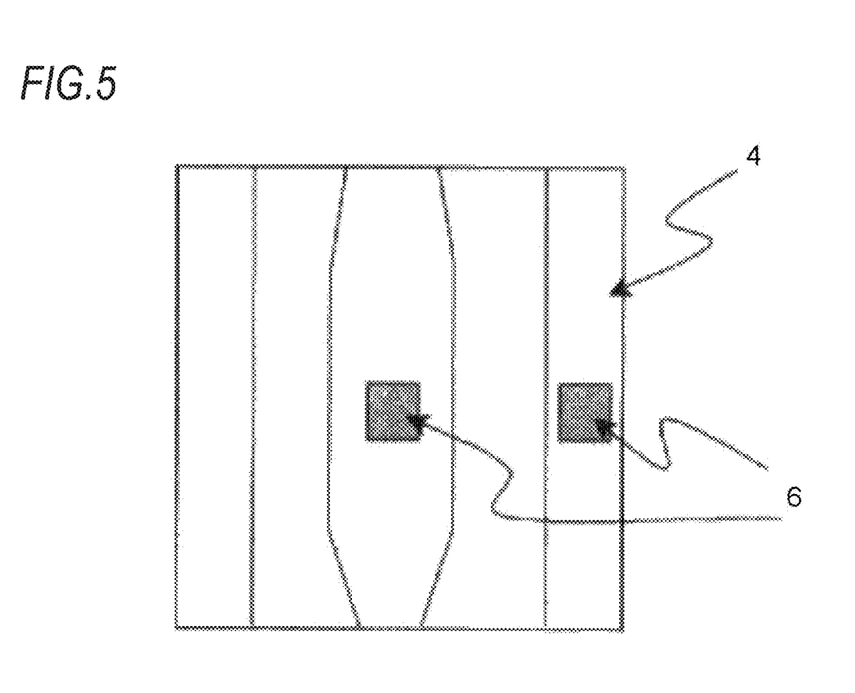
FIG. 5 is a schematic view illustrating a Vf measurement positions of shaped products obtained from Examples 6 and 7.

At two positions of the shaped product as illustrated in FIGS. 4 and 5, a sample was cut into a size of 3 cm×3 cm, and fibers were separated at 600° C. for 15 min. By using the fibers, the ratio (Vfs) obtained by dividing a larger value by a smaller value of fiber volume fractions (Vf) was obtained.

First, "manufacturing examples" of a random mat will be described below.

Manufacturing Example 1

Carbon fibers (Tenax STS40-24KS) were widened to a width of 20 mm and cut into a fiber length of 10 mm. The carbon fibers were introduced into a tapered tube at a supply amount of 301 g/min. Within the tapered tube, air was blown to the carbon fibers such that fiber bundles were partially fiber-opened to a required ratio and sprayed on a table provided below the outlet of the tapered tube. A polycarbonate resin, as a matrix resin, that had been frozen-pulverized into an average particle diameter of about 710 μm was supplied into the tapered tube at 480 g/min, and was sprayed together with the carbon fibers. Accordingly, a random mat with a thickness of about 1 mm which includes the carbon fibers (average fiber length: 10 mm) mixed with polycarbonate was obtained. The result is noted in Table 1. Here, carbon fiber bundles ($B_1$) having the carbon fiber of less than the critical number of single fiber and single carbon fibers ($B_2$) within the carbon fibers (B) were separated from each other by tweezers, and the content ratio thereof (by weight) was confirmed to be about 9:1.

Manufacturing example 2

Carbon fibers (Tenax IMS60-12K) were cut into a length of 20 mm. The carbon fibers were introduced into a tapered tube at a supply amount of 1,222 g/min. Within the tapered tube, air was blown to the carbon fibers such that fiber bundles were partially fiber-opened to a required ratio and sprayed on a table provided below the outlet of the tapered tube. PA66 fibers, as a matrix resin, that had been dry-cut into 2 mm, were supplied into the tapered tube at 3000 g/min, and were sprayed together with the carbon fibers. Accordingly, a random mat with a thickness of about 10 mm which includes the carbon fibers (average fiber length: 20 mm) mixed with polyamide 66 was obtained. The result is noted in Table 1.

Manufacturing example 3

Carbon fibers (Tenax STS40-24KS) were widened to a width of 20 mm and cut into a fiber length of 10 mm. The carbon fibers were introduced into a tapered tube at a supply amount of 301 g/min. Within the tapered tube, air was blown to the carbon fibers such that fiber bundles were partially fiber-opened to a required ratio and sprayed on a table provided below the outlet of the tapered tube. A polybutylene terephthalate (PBT) resin, as a matrix resin, that has an average particle diameter of 1 mm was supplied into the tapered tube at 480 g/min, and sprayed together with the carbon fibers. Accordingly, a random mat with a thickness of about 1 mm which includes the carbon fibers (average fiber length: 10 mm) mixed with PBT was obtained. The result is noted in Table 1.

Manufacturing Example 4

Carbon fibers (Tenax STS40-24KS) were widened to a width of 20 mm, slit into a width of 0.3 mm and cut into a fiber length of 20 mm. The cut carbon fibers were supplied to a tapered tube. Within the tapered tube, air was blown to the carbon fibers such that fiber bundles were partially fiber-opened to a required ratio and sprayed on a table provided below the outlet of the tapered tube so as to form a mat with a thickness of 4 mm. PA6 resin was molten by an extruder and the molten PA6 resin was supplied to the entire surface of the obtained mat from a T-die in a supply amount of 300 g/min based on 100 g/min of the carbon fibers. The portion on the mat surface to which the resin was supplied was heated by an infrared heater so as to suppress the resin from being cooled and solidified. This was heated and pressurized by one heating roller set to 280° C. to finally obtain a prepreg that includes the carbon fibers and PA6, and has a resin impregnation ratio of 99%, a thickness of 1.0 mm, and a fiber volume fraction of 18%. The result is noted in Table 1.

Manufacturing Example 5

Carbon fibers (Tenax STS40-24KS) were widened to a width of 20 mm and cut into a fiber length of 10 mm. The carbon fibers were introduced into a tapered tube at a supply amount of 301 g/min. Within the tapered tube, air was not blown to the carbon fibers and the carbon fibers were sprayed on a table provided below the outlet of the tapered tube. A polycarbonate resin, as a matrix resin, that had been frozen-pulverized into an average particle diameter of about 710 μm was supplied into the tapered tube at 480 g/min, and was sprayed together with the carbon fibers. Accordingly, a random mat with a thickness of about 1 mm which includes the carbon fibers (average fiber length: 10 mm) mixed with polycarbonate was obtained. The result is noted in Table 1.

Manufacturing Example 6

Carbon fibers (Tenax STS40-24KS) were widened to a width of 20 mm and cut into a fiber length of 10 mm. The carbon fibers were introduced into a tapered tube at a supply amount of 301 g/min. Within the tapered tube, air with a sufficiently strong wind force was blown to the carbon fibers such that fiber bundles were fiber-opened as much as possible and sprayed on a table provided below the outlet of the tapered tube. A polycarbonate resin, as a matrix resin, that had been frozen-pulverized into an average particle diameter of about 710 μm was supplied into the tapered tube at 480 g/min, and was sprayed together with the carbon fibers. Accordingly, a random mat with a thickness of about 1 mm which includes the carbon fibers (average fiber length: 10 mm) mixed with polycarbonate was obtained. The result is noted in Table 1.

Manufacturing Example 7

Glass fibers (EX-2500 (average fiber diameter 15 μm, fiber width 9 mm): manufactured by Nippon Electric Glass Co., Ltd. were cut into a length of 50 mm. The glass fibers were introduced into a tapered tube at a supply amount of 412 g/min. Within the tapered tube, air was blown to the glass fibers such that fiber bundles were partially fiber-opened and sprayed on a table provided below the outlet of the tapered tube. A polypropylene (PP) resin (polypropylene manufactured by Prime Polymer Co., Ltd.: Prime Polypro J108M, melting point 170° C., thermal decomposition temperature about 280° C.), as a matrix resin, that had been frozen-pulverized into an average particle diameter of about 1 mm was supplied into the tapered tube at 600 g/min, and was sprayed together with the glass fibers. Accordingly, a random mat with a thickness of about 1 mm which includes the glass fibers (average fiber length: 50 mm) mixed with PP was obtained. The result is noted in Table 1.

TABLE 1

| Manufacturing example | Carbon fiber | Matrix resin | Average fiber length | Critical number of single fiber | Ratio of carbon fiber bundles (A)[1] | Ratio of carbon fibers (B)[2] | Average number of fibers (N) within carbon fiber bundles (A) |
|---|---|---|---|---|---|---|---|
| 1 | TenaxSTS40-24KS | Polycarbonate resin | 10 mm | 86 | 35 | 65 | 240 |
| 2 | TenaxIMS60-12K | PA66 | 20 mm | 120 | 70 | 30 | 900 |
| 3 | TenaxSTS40-24KS | PBT resin | 10 mm | 86 | 60 | 40 | 300 |
| 4 | TenaxSTS40-24KS | PA66 | 20 mm | 86 | 60 | 40 | 800 |
| 5 | TenaxSTS40-24KS | Polycarbonate resin | 10 mm | 86 | 100 | 0 | 15,000 |
| 6 | TenaxSTS40-24KS | Polycarbonate resin | 10 mm | 86 | 4 | 96 | 50 |
| 7 | Glass fiber | PP resin | 50 mm | 40 | 68 | 32 | 60 |

Ratio of carbon fiber bundles (A)[1]: a volume ratio of carbon fiber bundles having a single fiber number not less than the critical number of single fiber, based on the total amount of fibers in a mat Ratio of carbon fibers (B)[2]: a volume ratio of a total of carbon fibers of carbon fiber bundles ($B_1$) having a single fiber number less than the critical number of single fiber and single carbon fibers ($B_2$), based on the total amount of fibers of a mat Example 1

The random mat manufactured in manufacturing example 1 was pressed by using a 500 t hydraulic press machine (manufactured by Kawasaki Hydromechanics Corporation) set with a plate mold for impregnation at 300° C. and 1 MPa for 5 min, and cooled to 50° C. to obtain a prepreg with a resin impregnation degree 99%, a thickness 0.6 mm, a fiber volume fraction 30%.

Figure 1:
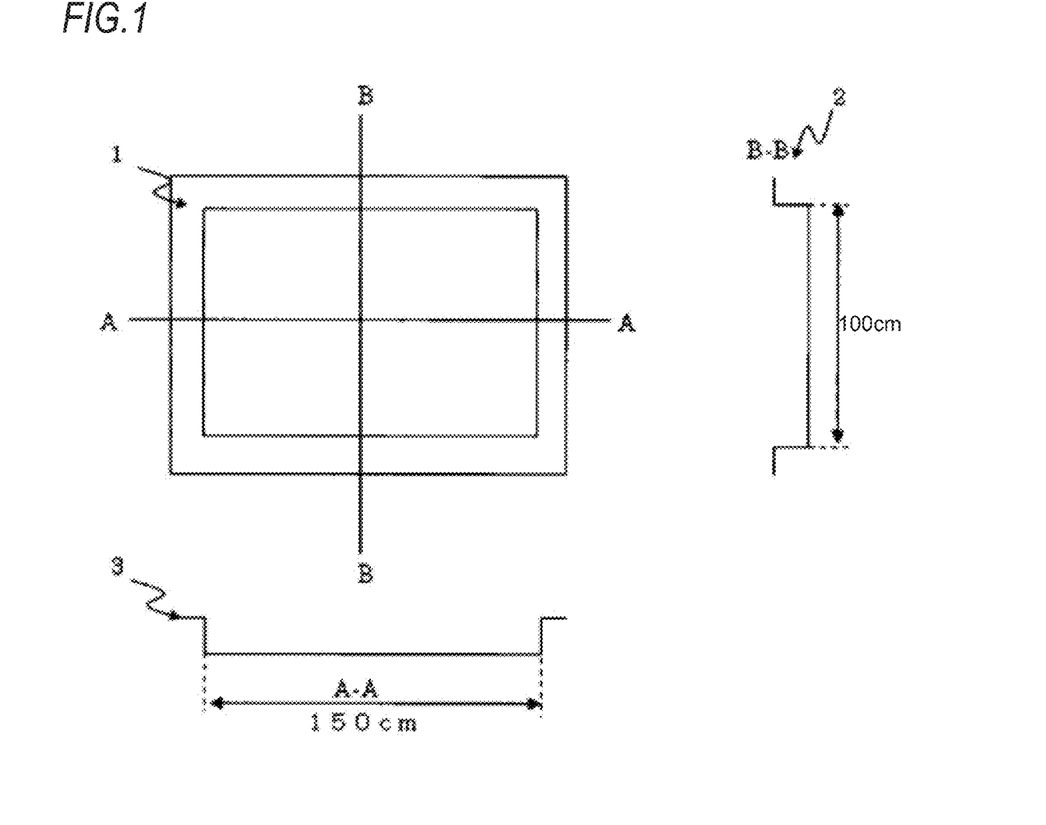
FIG. 1 is a plan view illustrating a mold that is used in Examples 1 to 5, Comparative Example 1 and Reference Example 1.

The obtained prepreg was heated up to 300° C. by using an IR oven manufactured by NGK kiln Tech. Four overlapping heated pregregs were arranged at the center of a mold with a mold temperature set to 120° C. as illustrated in FIG. 1 such that the charge rate was 80% based on the prepreg size of 100 cm×120 cm. Pressing (cold press) was performed at a slide lowering speed of 250 mm/sec and a pressure of 2.5 MPa for 60 sec to obtain a shaped product. The result is noted in Table 2. Eδ was close to 1, and isotropy was good. Also, Vfs was close to 1, and carbon fiber fraction was substantially uniform in the whole shaped product.

Example 2

The random mat manufactured in manufacturing example 2 was pressed by using a 500 t hydraulic press machine (manufactured by Kawasaki Hydromechanics Corporation) set with a plate mold for impregnation at 280° C. and 1 MPa for 5 min, and cooled to 50° C. to obtain a prepreg with a resin impregnation degree 99%, a thickness 3.2 mm, a fiber volume fraction 20%.

The obtained prepreg was heated up to 280° C. by using an IR oven manufactured by NGK kiln Tech, and arranged at the center of a mold with a mold temperature set to 100° C. as illustrated in FIG. 1 such that the charge rate was 60% based on the prepreg size of 90 cm×100 cm. Pressing (cold press) was performed at a slide lowering speed of 250 mm/sec and a pressure of 5 MPa for 60 sec to obtain a shaped product. The result is noted in Table 2. Eδ was close to 1, and isotropy was good. Also, Vfs was close to 1, and carbon fiber fraction was substantially uniform in the whole shaped product.

Example 3

The random mat manufactured in manufacturing example 3 was pressed by using a 500 t hydraulic press machine (manufactured by Kawasaki Hydromechanics Corporation) set with a plate mold for impregnation at 270° C. and 2 MPa for 5 min, and cooled to 50° C. to obtain a prepreg with a resin impregnation degree 99%, a thickness 0.6 mm, a fiber volume fraction 30%.

The obtained prepreg was heated up to 300° C. by using an IR oven manufactured by NGK kiln Tech. Four overlapping heated pregregs were arranged at the center of a mold with a mold temperature set to 120° C. as illustrated in FIG. 1 such that the charge rate was 80% based on the prepreg size of 100 cm×120 cm. Pressing (cold press) was performed at a slide lowering speed of 250 mm/sec and a pressure of 2.5 MPa for 60 sec to obtain a shaped product. The result is noted in Table 2. Eδ was close to 1, and isotropy was good. Also, Vfs was close to 1, and carbon fiber fraction was substantially uniform in the whole shaped product.

Example 4

The prepreg obtained from manufacturing example 4 was heated up to 280° C. by using an IR oven manufactured by NGK kiln Tech. Three overlapping heated prepregs were arranged at the center of a mold with a mold temperature set to 100° C. as illustrated in FIG. 1 such that the charge rate was 80% based on the prepreg size of 100 cm×120 cm. Pressing (cold press) was performed at a slide lowering speed of 250 mm/sec and a pressure of 5 MPa for 60 sec to obtain a shaped product. The result is noted in Table 2. Eδ was close to 1, and isotropy was good. Also, Vfs was close to 1, and carbon fiber fraction was substantially uniform in the whole shaped product.

Example 5

Four random mats manufactured from manufacturing example 1 overlapped, and were arranged at the center of a mold as illustrated in FIG. 1 by using a 500 t hydraulic press machine (manufactured by Kawasaki Hydromechanics Corporation) such that the charge rate was 80% based on the random mat size of 100 cm×120 cm. The random mats were pressed (hot press) at 300° C., 1 MPa for 7 min and cooled to 50° C. to obtain a shaped product with a resin impregnation degree 99%, a thickness 2.0 mm, and a fiber volume fraction 30%. The result is noted in Table 2. Eδ was close to 1, and isotropy was good. Also, Vfs was close to 1, and carbon fiber fraction was substantially uniform in the whole shaped product.

Example 6

Figure 2:
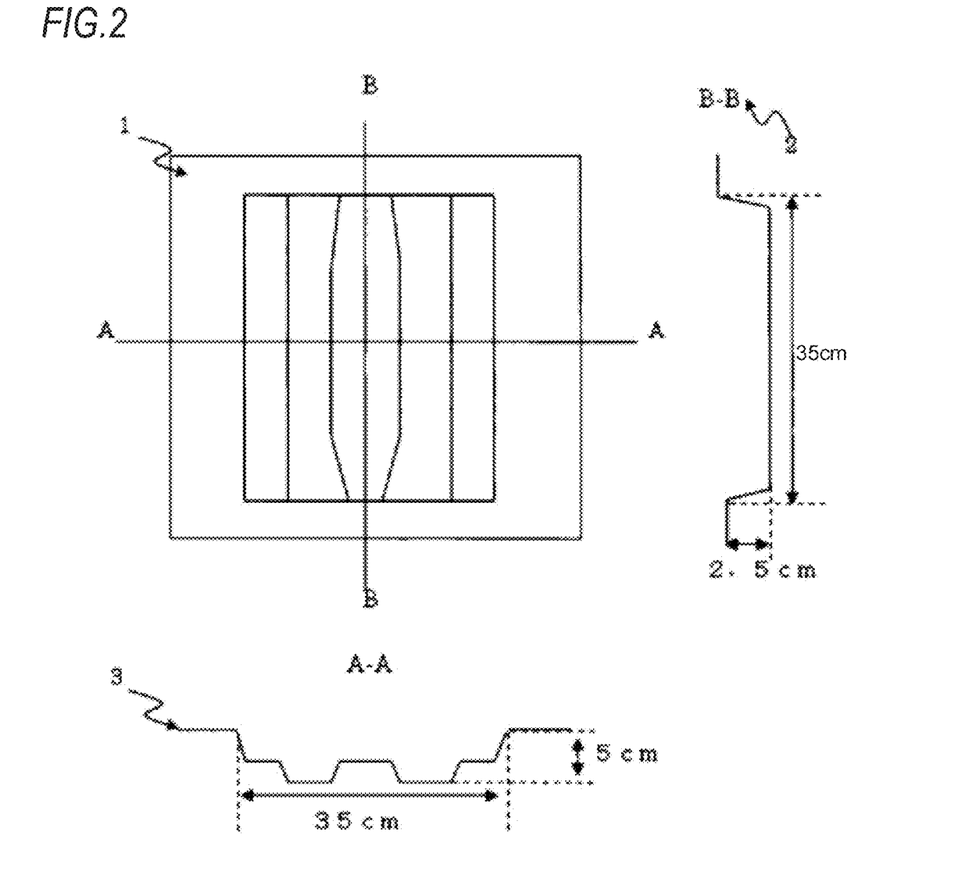
FIG. 2 is a plan view illustrating a mold that is used in Examples 6 and 7.

The random mat manufactured in manufacturing example 1 was pressed by using a 500 t hydraulic press machine (manufactured by Kawasaki Hydromechanics Corporation) set with a plate mold for impregnation at 300° C. and 1 MPa for 5 min, and cooled to 50° C. to obtain a prepreg with a resin impregnation degree 99%, a thickness 0.6 mm, a fiber volume fraction 30%. The obtained prepreg was heated up to 300° C. by using an IR oven manufactured by NGK kiln Tech. Four overlapping heated pregregs were arranged at the center of a mold with a mold temperature set to 120° C. as illustrated in FIG. 2 such that the charge rate was 80% based on the prepreg size of 31 cm×31 cm. Cold press was performed at a slide lowering speed of 250 mm/sec and a pressure of 2.5 MPa for 60 sec to obtain a shaped product. The result is noted in Table 2. Vfs was close to 1, and carbon fiber fraction was substantially uniform in the whole shaped product.

Example 7

The prepreg obtained from manufacturing example 4 was heated up to 280° C. by using an IR oven manufactured by NGK kiln Tech. Three overlapping heated prepregs were arranged at the center of a mold with a mold temperature set to 100° C. as illustrated in FIG. 2 such that the charge rate was 80% based on the prepreg size of 100 cm×120 cm. Pressing (cold press) was performed at a slide lowering speed of 250 mm/sec and a pressure of 0.8 MPa for 60 sec to obtain a shaped product. The obtained shaped product was not good in surface property, but the shape was molded in a size of the mold, as it is. The result is noted in Table 2. Vfs was close to 1, and carbon fiber fraction was substantially uniform in the whole shaped product.

TABLE 2

| Example | Used mat | Molding condition of shaped product | | | shaped product | |
|---|---|---|---|---|---|---|
| | | Temperature | Press pressure | Time | Eδ | Vfs |
| 1 | Manufacturing example 1 | 120° C. | 2.5 MPa | 60 sec | 1.1 | 1.1 |
| 2 | Manufacturing example 2 | 100° C. | 5 MPa | 60 sec | 1.3 | 1.1 |
| 3 | Manufacturing example 3 | 120° C. | 2.5 MPa | 60 sec | 1.2 | 1.0 |
| 4 | Manufacturing example 4 | 100° C. | 5 MPa | 60 sec | 1.1 | 1.0 |
| 5 | Manufacturing example 1 | 300° C. | 1 MPa | 7 min | 1.2 | 1.1 |
| 6 | Manufacturing example 1 | 120° C. | 2.5 MPa | 60 sec | — | 1.1 |
| 7 | Manufacturing example 4 | 100° C. | 0.8 MPa | 60 sec | — | 1.0 |
| Comparative Example 1 | Manufacturing example 5 | 120° C. | 2.5 MPa | 60 sec | 2.6 | 1.9 |
| Comparative Example 2 | Manufacturing example 6 | 120° C. | 2.5 MPa | 60 sec | — | — |
| Reference Example 1 | Manufacturing example 7 | 100° C. | 7 MPa | 60 sec | 1.1 | 1.0 |

—: not measured

Comparative Example 1

The random mat manufactured in manufacturing example 5 was pressed by using a 500 t hydraulic press machine (manufactured by Kawasaki Hydromechanics Corporation) set with a plate mold for impregnation at 300° C. and 1 MPa for 5 min, and cooled to 50° C. to obtain a prepreg with a resin impregnation degree 99%, a thickness 0.6 mm, a fiber volume fraction 30%.

The obtained prepreg was heated up to 300° C. by using an IR oven manufactured by NGK kiln Tech. Four overlapping heated pregregs were arranged at the center of a mold with a mold temperature set to 120° C. as illustrated in FIG. 1 such that the charge rate was 80% based on the prepreg size of 100 cm×120 cm. Cold press molding was performed at a slide lowering speed of 250 mm/sec and a pressure of 2.5 MPa for 60 sec to obtain a shaped product. The result is noted in Table 2. Eδ was large, and anisotropy was large mechanically. Also, Vfs was 1.9, and thus unevenness of Vf was confirmed. The reason for this is assumed to be that the ratio of carbon fiber bundles (A) based on the total amount of fibers of a mat was high (100%), and further the average number of fibers (N) was 15000, which was large.

Comparative Example 2

The random mat manufactured in manufacturing example 6 was pressed by using a 500 t hydraulic press machine (manufactured by Kawasaki Hydromechanics Corporation) set with a plate mold for impregnation at 300° C. and 1 MPa for 5 min, and cooled to 50° C. to obtain a prepreg with a resin impregnation degree 99%, a thickness 0.6 mm, a fiber volume fraction 30%.

The obtained prepreg was heated up to 300° C. by using an IR oven manufactured by NGK kiln Tech. Four overlapping heated pregregs were arranged at the center of a mold with a mold temperature set to 120° C. as illustrated in FIG. 1 such that the charge rate was 80% based on the prepreg size of 100 cm×120 cm. Cold press molding was performed at a slide lowering speed of 250 mm/sec and a pressure of 2.5 MPa for 60 sec. The result is noted in Table 2.

Since the ratio of carbon fiber bundles (A) based on the total amount of the fibers in a random mat was low (4%), four corner portions of about 25 cm of a shaped product were not flowed, and thus a complete shaped product was not obtained.

Reference Example 1

The random mat manufactured in manufacturing example 7 was pressed by using a 500 t hydraulic press machine (manufactured by Kawasaki Hydromechanics Corporation) set with a plate mold for impregnation at 220° C. and 1 MPa for 5 min, and cooled to 50° C. to obtain a prepreg with a resin impregnation degree 99%, a thickness 0.6 mm, a fiber volume fraction 20%.

The obtained prepreg was heated up to 220° C. by using an IR oven manufactured by NGK kiln Tech. Four overlapping heated pregregs were arranged at a mold with a mold temperature set to 100° C. as illustrated in FIG. 1 such that the charge rate was 80% based on the prepreg size of 100 cm×120 cm. Cold press was performed at a slide lowering speed of 250 mm/sec and a pressure of 7 MPa for 60 sec to obtain a shaped product. The result is noted in Table 2. It can be understood that when glass fibers were used instead of carbon fibers in this manner, a relatively high press pressure is required as compared to the case of using the carbon fibers.

INDUSTRIAL APPLICABILITY

According to the present invention, a random mat including carbon fiber bundles with a specific fiber length is impregnated with a thermoplastic resin, and press-molded at a low pressure to provide a shaped product good in isotropy, mechanical properties and productivity. This method is useful as a method for manufacturing a complicated shaped product or a large-sized shaped product since the molding may be performed at a low pressure.

The invention claimed is:

1. A method of manufacturing a shaped product including carbon fibers and a thermoplastic resin, the method comprising:
   (1) a process of preparing a random mat which includes the carbon fibers including carbon fiber bundles with an average fiber length of 5 mm to 100 mm and the thermoplastic resin;
   (2) a process of impregnating the thermoplastic resin into the carbon fiber bundles by heating and pressurizing the random mat up to a temperature of a melting point of the thermoplastic resin or more and less than a decomposition temperature of the thermoplastic resin in a case where the thermoplastic resin is crystalline, or up to a temperature of a glass transition temperature of the thermoplastic resin or more and less than a decomposition temperature of the thermoplastic resin in a case where the thermoplastic resin is amorphous, before or after arranging the random mat within a mold;
   (3) a process of pressurizing and molding the random mat in which the thermoplastic resin is impregnated into the carbon fiber bundles within the mold at a pressure ranging from 0.1 MPa to 20 MPa; and
   (4) a process of taking out the shaped product obtained from the mold,
   wherein the processes (1) to (4) are performed in this order, in the random mat, the carbon fibers have a fiber areal weight ranging from 25 g/m² to 10,000 g/m², are substantially randomly oriented in-plane direction, and
   the carbon fiber bundles include carbon fiber bundles (A) having the carbon fibers of not less than a critical number of single fiber defined by equation (1), and carbon fibers (B) having the carbon fibers of less than the critical number of single fiber, in which a ratio of the carbon fiber bundles (A) is 20 Vol % or more and less than 99 Vol % based on a total amount of the carbon fibers in the random mat:

$$\text{Critical number of single fiber}=600/D \quad (1)$$

wherein, D represents an average fiber diameter (μm) of single carbon fiber.

2. The method according to claim 1,
   wherein the process (1) includes a process (1-1) of cutting and then opening the carbon fibers.

3. The method according to claim 1,
   wherein in the process (3), the pressure ranges from 0.5 MPa to 10 MPa.

4. The method according to claim 3,
   wherein the pressure ranges from 0.5 MPa to 5 MPa.

5. The method according to claim 1,
   wherein the process (2) includes a process (2-1) of impregnating the thermoplastic resin into the carbon fiber bundles by heating and pressurizing the random mat before arranging the random mat within the mold, and
   the process (3) includes a process (3-1) of arranging the random mat impregnated within the mold, and pressurizing and molding the random mat in the mold controlled to a temperature less than a crystallization temperature of the thermoplastic resin in a case where the thermoplastic resin is crystalline, or to a temperature less than a glass transition temperature of the thermoplastic resin in a case where the thermoplastic resin is amorphous.

6. The method according to claim 5,
   wherein the process (3-1) includes a process (3-2) of clamping the mold at a slide lowering speed of 50 mm/sec to 10,000 mm/sec before pressurizing the random mat.

7. The method according to claim 1,
   wherein the process (2) includes a process (2-2) of impregnating the thermoplastic resin into the carbon fiber bundles by heating and pressurizing the random mat, due to heating the mold up to the temperature of a melting point of the thermoplastic resin or more and less than the decomposition temperature of the thermoplastic resin in a case where the thermoplastic resin is crystalline, or up to the temperature of a glass transition temperature of the thermoplastic resin or more and less than the decomposition temperature of the thermoplastic resin in a case where the thermoplastic resin is amorphous, after arranging the random mat within the mold,
   wherein after the process (2-2), the process (3) is performed.

8. The method according to claim 1,
   wherein a content ratio of the thermoplastic resin to the carbon fibers in the random mat ranges from 50 parts to 1,000 parts by weight based on 100 parts by weight of the carbon fibers.

9. The method according to claim 1,
   wherein an average number of fibers (N) in the carbon fiber bundles (A) in the random mat satisfies following equation (2):

$$0.7\times10^4/D^2<N<1\times10^5/D^2 \quad (2)$$

wherein D represents an average fiber diameter (μm) of single carbon fiber.

10. The method according to claim 9,
    wherein a ratio of the carbon fiber bundles (A) is 30 Vol % or more and less than 90 Vol % based on a total amount of the carbon fibers in the random mat.

* * * * *